United States Patent [19]

Yasunaga et al.

[11] Patent Number: 5,069,933
[45] Date of Patent: Dec. 3, 1991

[54] METHOD FOR MAKING MAGNETIC RECORDING MEDIA

[75] Inventors: Tadashi Yasunaga; Shiro Kaneko; Kunihiko Sano, all of Kanagawa, Japan

[73] Assignee: Fuji Photo Film Co., Ltd., Kanagawa, Japan

[21] Appl. No.: 634,663

[22] Filed: Dec. 27, 1990

[30] Foreign Application Priority Data

Dec. 27, 1989 [JP] Japan ................................. 1-339809

[51] Int. Cl.$^5$ .............................................. H01F 10/02
[52] U.S. Cl. ..................................... 427/130; 427/131; 427/132
[58] Field of Search ........................... 427/127–132, 427/48; 428/900, 694, 695; 252/62.54

Primary Examiner—Bernard Pianalto
Attorney, Agent, or Firm—Sughrue, Mion, Zinn, Macpeak & Seas

[57] ABSTRACT

A method for making a magnetic recording medium comprises the steps of forming a thin ferromagnetic metal film on a non-magnetic substrate. The thin ferromagnetic metal film contains Co as a main constituent and contains oxygen in a proportion of at least 15 at %. Thereafter, the thin ferromagnetic metal film is exposed to an ozone-containing atmosphere. A magnetic recording medium is thereby obtained, which exhibits excellent resistance to corrosion with salts and good electromagnetic transducing characteristics.

5 Claims, 3 Drawing Sheets

METHOD FOR MAKING MAGNETIC RECORDING MEDIA

BACKGROUND OF THE INVENTION

1. Field of the Invention

This invention relates to a method for making a magnetic recording medium. This invention particularly relates to a method for making a magnetic recording medium, which comprises a non-magnetic substrate and a thin ferromagnetic metal film overlaid on the non-magnetic substrate and which exhibits improved resistance to corrosion.

2. Description of the Prior Art

As media for recording and reproducing magnetic information, coated types of magnetic recording media have heretofore been used widely. The coated types of magnetic recording media comprise a non-magnetic substrate and a magnetic layer overlaid on the non-magnetic substrate. The magnetic layer is formed by applying a magnetic coating composition, which contains magnetic grains and an organic binder, or the like, to the non-magnetic substrate and then drying it.

Nowadays there is a strong demand for magnetic recording media on which magnetic information can be recorded at high densities. This demand cannot be satisfied with the conventional coated types of magnetic recording media. For example, in a Hi-8 system, magnetic information is recorded at a high density with wavelengths shorter than $0.5\mu m$. For such a system, thin metal film types of magnetic recording media are substantially suitable and have been used in practice. The thin metal film types of magnetic recording media comprise a non-magnetic substrate and a thin ferromagnetic metal film overlaid on the non-magnetic substrate. The thin metal film types of magnetic recording media are advantageous in that they have a high magnetic energy level and the thickness of the magnetic layer can be kept thin.

However, the thin metal film types of magnetic recording media have the drawbacks in that their thin magnetic metal layers are easily corroded by water and oxygen.

Research and development of thin metal film types of magnetic recording media (tapes) are mainly directed to vapor deposition tapes, which have a magnetic layer formed with an oblique incidence vacuum evaporation process wherein a CoNi alloy is evaporated in oxygen. Originally developed vapor deposition tapes have the problems in that they rust when they are left to stand in the air, and their magnetic properties deteriorates to a half level with the passage of time of approximately one year. Therefore, the originally developed vapor deposition tapes are not satisfactory from the point of view of storage of magnetic information.

Various attempts have heretofore been made to eliminate the following problems with regard to corrosion of vapor deposition tapes:

1) Ambient moisture condenses and dries on thin ferromagnetic metal films, and the thin ferromagnetic metal films thereby rust.
2) Magnetic properties of thin ferromagnetic metal films deteriorate (i.e. they are demagnetized) during their storage at a high temperature and high humidity.
3) Surfaces of thin ferromagnetic metal films are caused to rust by sulfur dioxide, nitric oxide, or the like, which is present in the air.
4) Surfaces of thin ferromagnetic metal films are caused to rust by salts, such as NaCl, which are contained in small droplets of brine, in areas near coasts.

As for the problems in (1), (2), and (3), various techniques have been proposed, which can improve the corrosion resistance of thin ferromagnetic metal film to a practically acceptable level. However, as for corrosion with salts in (4), no suitable means has yet been found.

Specifically, a certain technique, which is suitable for eliminating one of the problems in (1), (2), and (3) and keeping the corrosion resistance of vapor deposition tapes high, is not necessarily advantageous for the elimination of all of the problems described above, or causes other new problems to occur. Therefore, the conventional techniques for keeping the corrosion resistance of vapor deposition tapes high are not suitable from the point of view of the whole characteristics of magnetic recording media.

For example, a method has been proposed wherein an inorganic protective layer constituted of $SiO_2$, C, or $TiO_2$ is overlaid on a thin ferromagnetic metal film. With the proposed method, in order for a necessary level of corrosion resistance to be obtained, the thickness of the protective layer must be at least 300Å. Therefore, because of spacing loss, the reproduction output power decreases. The reproduction output power should be prevented from decreasing, in particular, in cases where magnetic information is recorded with short wavelengths which are ordinarily employed for magnetic recording media provided with thin metal films.

Also, methods have been proposed wherein thin ferromagnetic metal films are imparted with corrosion resistance through various types of post-treatment. For example, a method has been proposed wherein a magnetic recording medium is kept at a predetermined temperature and predetermined humidity. Also, a method has been proposed wherein a passivity film is formed by an electrochemical technique. Additionally, a method has been proposed wherein oxidization treatment is carried out on vapor deposition tape webs. With these proposed methods, the problems in (1) and (2) can be eliminated, and resistance to corrosion with moisture can thereby be improved. However, with the proposed methods, thin ferromagnetic metal films cannot be prevented from rusting when they are exposed to salts.

Additionally, novel methods for improving corrosion resistance of thin ferromagnetic metal films have been disclosed in, for example, Japanese Unexamined Patent Publication Nos. 58(1983)-26319, 58(1983)-26322, 58(1983)-60432, 59(1984)-63031, and 59(1984)-60738. With the disclosed methods, ozone is brought into contact with thin ferromagnetic metal films while they are being formed, or thin ferromagnetic metal films which have been formed are exposed to an ozone-containing atmosphere. The disclosed methods have larger effects of improving corrosion resistance of thin ferromagnetic metal films than the conventional methods.

However, with the disclosed methods, resistance of thin ferromagnetic metal films to corrosion with salts described above in (4) cannot be kept sufficiently high.

SUMMARY OF THE INVENTION

The primary object of the present invention is to provide a method for making a magnetic recording medium, which is of the thin metal film type and exhibits excellent resistance to corrosion with salts.

Another object of the present invention is to provide a method for making a magnetic recording medium, which exhibits good electromagnetic transducing characteristics and an excellent weatherability.

The present invention provides a method for making a magnetic recording medium, which comprises the steps of:

i) forming a thin ferromagnetic metal film on a non-magnetic substrate, said thin ferromagnetic metal film containing Co as a main constituent and containing oxygen in a proportion of at least 15 at%, and ii) thereafter exposing said thin ferromagnetic metal film to an ozone-containing atmosphere.

The magnetic recording medium made with the method in accordance with the present invention is provided with the thin ferromagnetic metal film containing Co as the main constituent. Therefore, the magnetic recording medium made with the method in accordance with the present invention exhibits excellent electromagnetic transducing characteristics. Also, the thin ferromagnetic metal film contains oxygen in a proportion of at least 15 at%, and has been exposed to an ozone-containing atmosphere. Therefore, the magnetic recording medium made with the method in accordance with the present invention exhibits excellent resistance to corrosion, in particular, higher resistance to corrosion with salts than conventional thin metal film types of magnetic recording media. Accordingly, the magnetic recording medium made with the method in accordance with the present invention exhibits excellent weatherability.

DETAILED DESCRIPTION OF THE INVENTION

Figure 1:
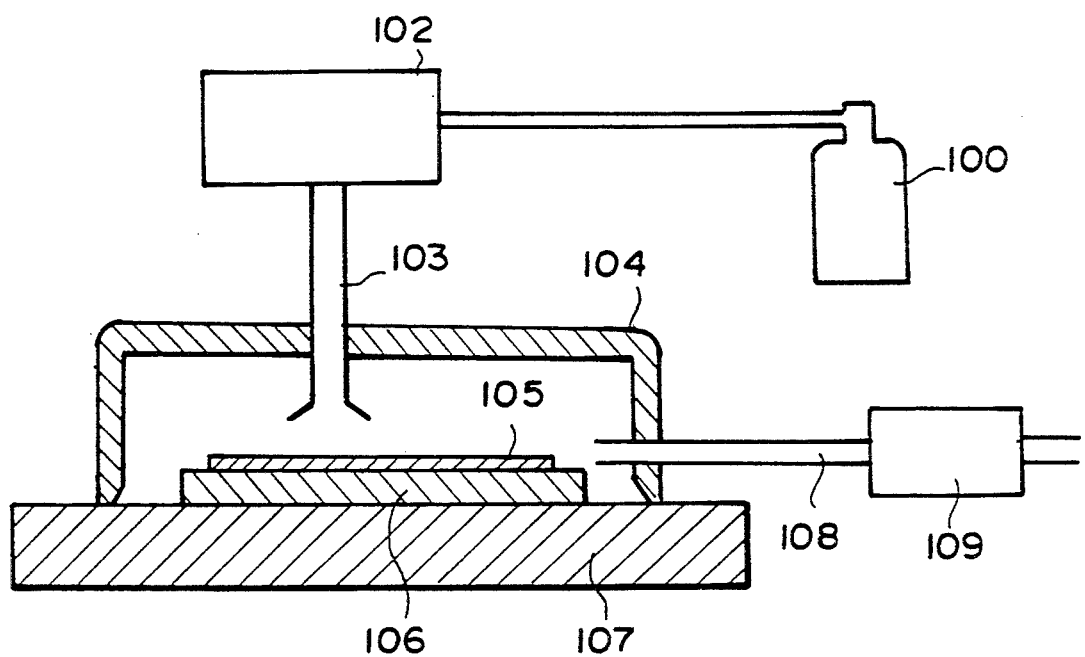
FIG. 1 is a schematic view showing the major part of a batch ozone treatment apparatus, which is employed to carry out ozone treatment of a thin ferromagnetic metal film of a magnetic recording medium with an embodiment of the method for making a magnetic recording medium in accordance with the present invention.

In cases where oxygen is merely contained in a thin ferromagnetic metal film of a magnetic recording medium or the thin ferromagnetic metal film is merely exposed to an ozone-containing atmosphere, though resistance of the magnetic recording medium to corrosion with oxygen and moisture can be improved, resistance thereof to corrosion with salts, such as NaCl, cannot be kept sufficiently high. However, with the method for making a magnetic recording medium in accordance with the present invention, the oxygen content in a thin ferromagnetic metal film is specified, and the thin ferromagnetic metal film is treated with ozone after the film is formed. As a result, resistance of the magnetic recording medium to oxygen, moisture, and salts can be kept markedly high.

Resistance of thin metal film types of magnetic recording media, which are made with conventional methods, to salts is not sufficiently high. Therefore, the characteristics of such magnetic recording media will deteriorate if the magnetic recording media are used in coast or hot spring districts or if salt-containing substances, such as sweat, comes into contact with the magnetic recording media. As described above, thin metal film types of magnetic recording media, which are made with the method in accordance with the present invention, exhibit excellent resistance not only to oxygen and moisture but also to salts. Therefore, the method for making a magnetic recording medium in accordance with the present invention can eliminate the problems with regard to corrosion resistance, which have heretofore occurred with conventional thin metal film types of magnetic recording media.

Accordingly, the method for making a magnetic recording medium in accordance with the present invention is advantageous in keeping the reliability of thin metal film types of magnetic recording media in practical use and expanding their applications.

The oxygen content in the thin ferromagnetic metal film of the magnetic recording medium made with the method in accordance with the present invention is at least 15 at%, and should preferably be at least 20 at%.

If the oxygen content in the thin ferromagnetic metal film is lower than 15 at%, large effects of improving corrosion resistance cannot be obtained.

However, the oxygen content in the thin ferromagnetic metal film should preferably be not higher than 30 at%. If the oxygen content is higher than 30 at%, the proportion of the non-magnetic constituent in the thin ferromagnetic metal film will become too large. As a result, the electromagnetic transducing characteristics of the magnetic recording medium will be affected adversely.

Also, oxygen should preferably be distributed in the thickness direction of the thin ferromagnetic metal film such that each of the oxygen content at part in the vicinity of the non-magnetic substrate and the oxygen content at part in the vicinity of the front surface of the thin ferromagnetic metal film, which surface is remoter from the non-magnetic substrate than the other surface is, is higher than the oxygen content at part in the vicinity of the middle of the thin ferromagnetic metal film.

Specifically, the thickness of the thin ferromagnetic metal film is divided into five equal divisions by carrying out a depth analysis utilizing Auger electron spectroscopy (AES). One fifth of the whole thickness of the thin ferromagnetic metal film, which fifth is closest to the front surface of the thin ferromagnetic metal film, is referred to as a portion in the vicinity of the front surface of the thin ferromagnetic metal film. One fifth of the whole thickness of the thin ferromagnetic metal film, which fifth is closest to the non-magnetic substrate, is referred to as a portion in the vicinity of the non-magnetic substrate. Also, the region of the thin ferromagnetic metal film other than the portion in the vicinity of the front surface and in the vicinity of the non-magnetic substrate is referred to as a portion in the vicinity of the middle of the thin ferromagnetic metal film. In such cases, oxygen should preferably be distributed in the thickness direction of the thin ferromagnetic metal film such that the oxygen content in the vicinity of the middle of the thin ferromagnetic metal film is lower than each of the oxygen content in the vicinity of the front surface of the thin ferromagnetic metal film and the oxygen content in the vicinity of the non-magnetic substrate.

Each of the oxygen content at part in the vicinity of the front surface of the thin ferromagnetic metal film and the oxygen content in the vicinity of the non-magnetic substrate should preferably be at least 5 at%. Also, the oxygen content in the vicinity of the middle of the thin ferromagnetic metal film should preferably fall within the range of 3 to 4 at%.

As described above, oxygen should preferably be distributed such that each of the oxygen content in the vicinity of the non-magnetic substrate and the oxygen content in the vicinity of the front surface of the thin ferromagnetic metal film is higher than the oxygen content in the vicinity of the middle of the thin ferromagnetic metal film. In such cases, large effects can be obtained from the exposure of the thin ferromagnetic metal film to an ozone-containing atmosphere. As a result, a magnetic recording medium can be made which exhibits high resistance to corrosion with salts.

As described above, characteristic effects can be obtained from the method for making a magnetic recording medium in accordance with the present invention. This is presumably because, when the thin ferromagnetic metal film is exposed to an ozone-containing atmosphere, a denser oxide layer is formed on the surface of the thin ferromagnetic metal film than with conventional oxidation treatment.

With the method for making a magnetic recording medium in accordance with the present invention, a thin ferromagnetic metal film having a predetermined thickness is overlaid on the non-magnetic substrate by a vacuum film forming process, such as a vacuum evaporation process, such that Co is contained as the main constituent and oxygen is distributed in the manner described above. Thereafter, the thin ferromagnetic metal film, which has thus been formed, is exposed to an ozone-containing atmosphere, and a magnetic recording medium is thereby made.

During the exposure of the thin ferromagnetic metal film to an ozone-containing atmosphere, it is necessary that the temperature, at which the thin ferromagnetic metal film is kept, the concentration of ozone in the ozone-containing atmosphere, and the time during which the thin ferromagnetic metal film is exposed to the ozone-containing atmosphere be controlled appropriately.

The temperature, at which the thin ferromagnetic metal film is kept during its exposure to an ozone-containing atmosphere, is not critical. However, the temperature should preferably be higher than room temperature. This is because, at room temperature, exposure of the thin ferromagnetic metal film must be carried out for a long time in an atmosphere containing ozone at a high concentration.

In order for high corrosion resistance to be achieved, the temperature, at which the thin ferromagnetic metal film is kept during its exposure to an ozone-containing atmosphere, should be as high as possible. However, the temperature should not be higher than 140° C. from the point of view of heat resistance of the non-magnetic substrate, e.g. a high polymeric base film, particularly a polyethylene terephthalate film which is ordinarily employed in making magnetic tapes. Also, if the temperature is higher than 140° C., large inverse cupping occurs with magnetic tapes, and they cannot fit a magnetic head.

Accordingly, the temperature, at which the thin ferromagnetic metal film is kept during its exposure to an ozone-containing atmosphere, should preferably fall within the range of 80° C. to 140° C.

The concentration of ozone in the ozone-containing atmosphere and the time during which the thin ferromagnetic metal film is exposed to the ozone-containing atmosphere should preferably be adjusted such that the product of x and y may be at least 150,000, wherein x represents the concentration of ozone in ppm, and y represents the time in second. If the product of x and y is smaller than 150,000, sufficient effects of improving resistance of the thin ferromagnetic metal film to corrosion with salts cannot be obtained.

Before being exposed to the ozone-containing atmosphere, the surface of the thin ferromagnetic metal film should be kept clean. If contaminants are present on the surface of the thin ferromagnetic metal film, sufficient effects of the method in accordance with the present invention cannot be obtained. This is presumably because part of ozone is consumed to remove the contaminants.

Therefore, it is necessary that the cleanliness of the surface of the thin ferromagnetic metal film be controlled in terms of, for example, the contact angle of a water droplet on the surface. Before being exposed to the ozone-containing atmosphere, the surface of the thin ferromagnetic metal film should be kept clean such that the contact angle is at most 60°.

As the ozone-containing atmosphere, it is possible to employ an ozone-containing oxygen gas, a dry air containing ozone, or an inert gas (such as nitrogen, argon, or helium) containing ozone.

Treatment with ozone may be carried out by placing the thin ferromagnetic metal film for a predetermined period in a treatment chamber, into which ozone is introduced from an ozone producing device, such as an ozonizer. Treatment with ozone may be carried out batch-wise or continuously.

FIG. 1 is a schematic view showing the major part of an example of a batch ozone treatment apparatus. With reference to FIG. 1, a treatment zone is defined by a housing 104, and a hot plate 106 is located in the treatment zone. A sample 105, which comprises a non-magnetic substrate and a thin ferromagnetic metal film overlaid on the non-magnetic substrate, is secured to the hot plate 106 such that the thin ferromagnetic metal film may face up. The sample 105 is kept at a predetermined temperature by the hot plate 106. Oxygen gas is introduced from an oxygen gas cylinder 100 into an ozonizer 102, and ozone is thereby generated. The oxygen gas, part of which has been ozonized, is fed through an inlet pipe 103 onto the sample 105. In this manner, the thin ferromagnetic metal film is treated with ozone. The oxygen gas, part of which has been ozonized, is then guided through an outlet pipe 108 into a catalytic decomposition device 109, and decomposed therein.

Figure 2:
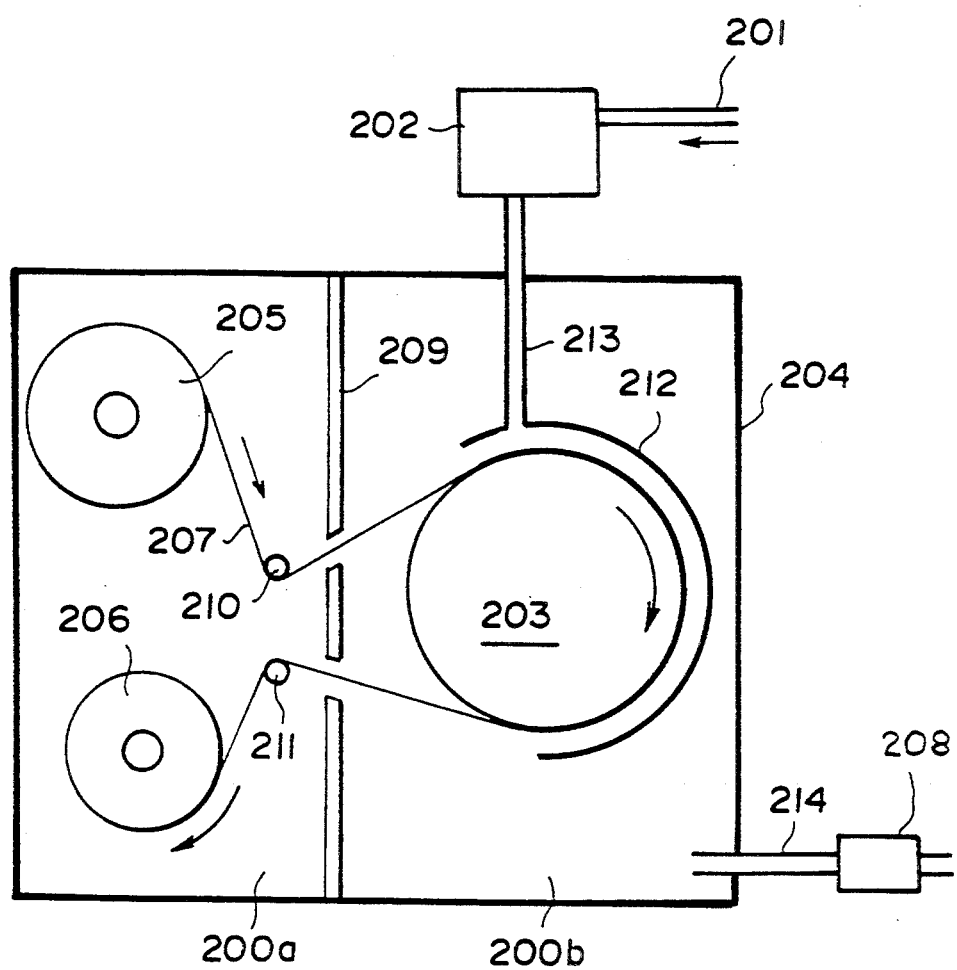
FIG. 2 is a schematic view showing the major part of a continuous ozone treatment apparatus, which is employed to carry out ozone treatment of a thin ferromagnetic metal film of a magnetic recording medium with an embodiment of the method for making a magnetic recording medium in accordance with the present invention.

FIG. 2 is a schematic view showing the major part of an example of a continuous ozone treatment apparatus.

A continuous ozone treatment apparatus 204 comprises a feed and wind-up chamber 200a, in which a feed roll 205 and a wind-up roll 206 are located. A long sample 207, which comprises a non-magnetic substrate and a thin ferromagnetic metal film overlaid on the non-magnetic substrate, has been wound around the feed roll 205. The long sample 207 is threaded over a conveying roll 210, passes through an opening of a partition wall 209 into a treatment chamber 200b, and is then threaded over a heating roll 203. The long sample 207 then passes through an opening of the partition wall 209, is threaded over a conveying roll 211, and is then wound up around the wind-up roll 206. The long sample 207 is conveyed such that the non-magnetic substrate comes into contact with the heating roll 203. The long sample 207 is heated at a predetermined temperature while it is being threaded over the heating roll 203. A cover 212 is located facing part of the circumferential surface of the heating roll 203. A gas containing ozone produced by an ozonizer 202 is introduced through an inlet pipe 213 onto the long sample 207, which is being threaded over the heating roll 203. In this manner, the thin ferromagnetic metal film is treated with ozone. The ozone-containing gas is then guided through an outlet pipe 214 into a catalytic decomposition device 208 and decomposed therein.

The thin ferromagnetic metal film may be constituted of Co, which contains oxygen in a proportion of at least 15 at%. Alternatively, the thin ferromagnetic metal film may be constituted of an alloy containing Co as the main constituent and containing oxygen in a proportion of at least 15 at%. By way of example, the alloy may be CoNi or CoCr. Specifically, because oxygen is contained, the thin ferromagnetic metal film is constituted of a material expressed as Co-O, CoNi-O, CoCr-O, or the like.

The oxygen content in the thin ferromagnetic metal film is calculated by carrying out a depth analysis utilizing Auger electron spectroscopy (AES).

The thin ferromagnetic metal film is overlaid on the non-magnetic substrate with a vacuum film forming process, such as vacuum evaporation process or a sputtering process. In order for a predetermined amount of oxygen to be contained in the thin ferromagnetic metal film, oxygen is introduced into the film forming chamber while the thin ferromagnetic metal film is being formed therein.

The thickness of the thin ferromagnetic metal film should preferably fall within the range of 500Å to 3,000Å.

The non-magnetic substrate may be constituted of a high polymeric film, such as a polyethylene terephthalate film or a polyimide film. The appropriate thickness of the non-magnetic substrate varies in accordance with purposes for which the magnetic recording medium is used. Ordinarily, the thickness of the non-magnetic substrate falls within the range of several microns to several tens of microns.

In order for the durability of the thin ferromagnetic metal film to be maintained, various lubricants may be applied to the surface of the thin ferromagnetic metal film. Various known compounds may be employed as the lubricants.

By way of example, fatty esters, higher fatty acids, salts of higher fatty acids, silane compounds, fluorine-containing compounds, or the like, may be employed as the lubricants.

In order for the movement characteristics of the magnetic recording medium to be maintained, a back coating layer, which is primarily composed of fine grains, such as carbon black, and a binder resin, may be overlaid on the surface of the non-magnetic substrate opposite to the thin ferromagnetic metal film.

Also, in order that adhesion between the thin ferromagnetic metal film and the non-magnetic substrate may be maintained, an intermediate layer may be provided therebetween.

The present invention will further be illustrated by the following nonlimitative examples.

EXAMPLE 1

Figure 3:
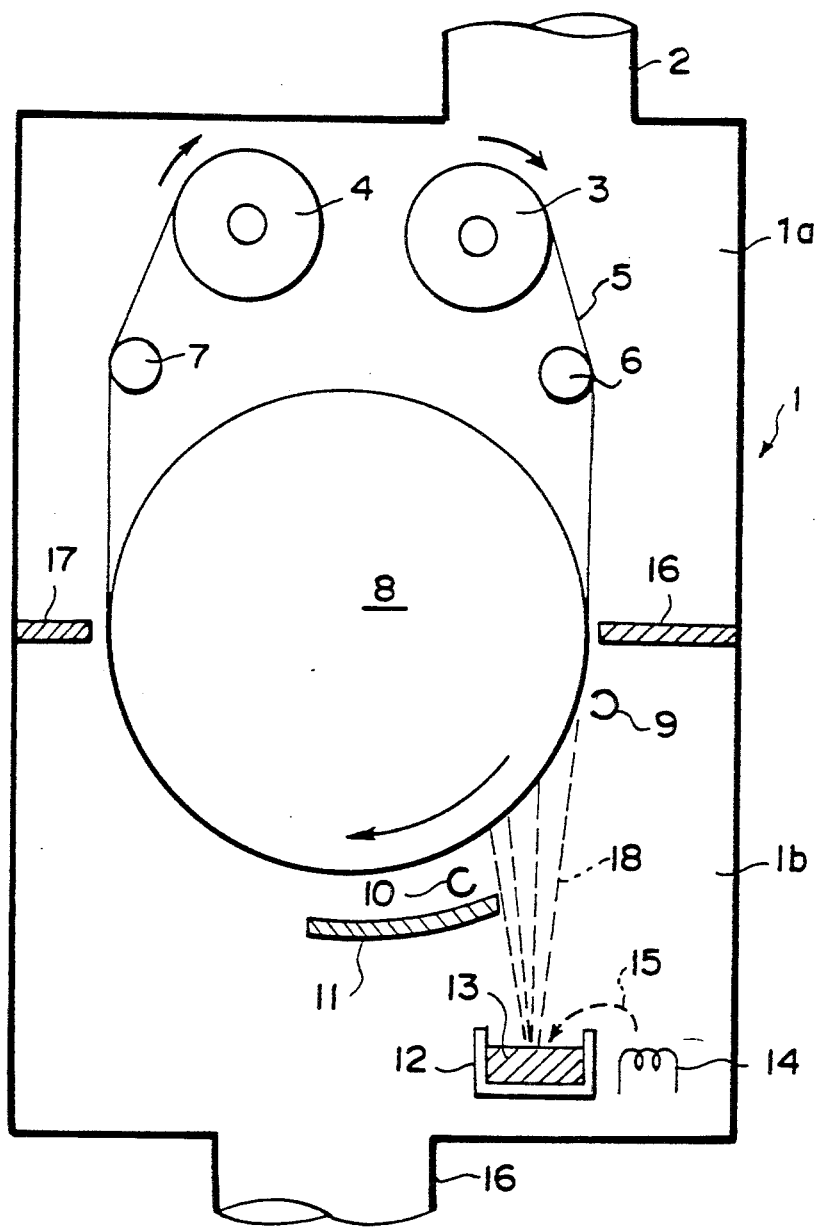
FIG. 3 is a schematic view showing the major part of an oblique incidence vacuum evaporation apparatus, which is employed to form a thin ferromagnetic metal film of a magnetic recording medium with an embodiment of the method for making a magnetic recording medium in accordance with the present invention.

A magnetic recording medium web in accordance with the present invention was made in the manner described below with a vacuum evaporation apparatus, the major part of which is shown in FIG. 3.

In a vacuum evaporation apparatus 1, a feed and wind-up chamber 1a and a film formation chamber 1b were evacuated through evacuation pipes 2 and 16. In this manner, the film formation chamber 1b was evacuated to a vacuum of at least $5 \times 10^{-5}$ Torr. Thereafter, a non-magnetic magnetic substrate 5 constituted of a 100 mm-wide, 9.7 $\mu$m-thick polyethylene terephthalate film was delivered at a conveyance speed of 20 m/minute from a feed roll 3, which was located in the feed and wind-up chamber 1a. The non-magnetic magnetic substrate 5 was conveyed by a conveying roll 6, passed between a partition plate 16 and a cooling can 8, and entered the film formation chamber 1b. The non-magnetic substrate 5 was then fed along the cooling can 8. It then passed between the cooling can 8 and a partition plate 17 and entered the feed and wind-up chamber 1b. Thereafter, the non-magnetic substrate 5 was conveyed by a conveying roll 7 and wound up around a wind-up roll 4.

Oxygen was introduced from a first oxygen inlet 9 at a rate of 1,000 cc/minute, and from a second oxygen inlet 10 at a rate of 800 cc/minute. An alloy 13 containing 80% of Co and 20% of Ni was placed in a crucible 12 and heated with an electron beam 15, which was produced by an electron beam source 14. A stream of vapor 18 of the alloy 13 was thereby produced. With a shutter 11, the angle of incidence of the steam of vapor 18 upon the surface of the non-magnetic substrate 5, which was moving along the cooling can 8, was adjusted to be 35°. In this manner, a thin ferromagnetic metal film having a thickness of 2,200Å was overlaid on the non-magnetic substrate 5, and a magnetic recording medium web was thereby made.

Thereafter, 80 mm-square samples were cut out of the magnetic recording medium web and treated with ozone in the batch ozone treatment apparatus, the major part of which is shown in FIG. 2.

During the treatment with ozone, the concentration of ozone in the treatment chamber was 28,000 ppm. Also, the temperatures of the samples were kept at 120° C. by the hot plate.

The time, during which each sample was treated with ozone, was selected from 3 seconds, 10 seconds, 30 seconds, and 3 minutes. In this manner, four kinds of samples of the magnetic recording medium web were prepared.

EXAMPLE 2

A thin ferromagnetic metal film was overlaid on the non-magnetic substrate 5 in the same manner as that in Example 1, except that no oxygen was introduced from the first oxygen inlet 9 of the vapor evaporation apparatus shown in FIG. 3 and oxygen was introduced at a rate of 800 cc/minute from the second oxygen inlet 10. Thereafter, treatment with ozone was carried out, and four kinds of samples of the magnetic recording medium web were prepared under different ozone treatment conditions.

EXAMPLE 3

Five kinds of samples of the magnetic recording medium web were prepared at different ozone treatment temperatures. The samples were prepared in the same manner as that in Example 1, except that the time, during which each sample was treated with ozone, was kept at 30 seconds and the temperature of the thin ferromagnetic metal film of each sample was selected from 23° C., 50° C., 80° C., 120° C., and 140° C. by changing the temperature of the hot plate 106 of the batch ozone treatment apparatus shown in FIG. 1.

EXAMPLE 4

Three kinds of samples of the magnetic recording medium web were prepared at different ozone concentrations. The samples were prepared in the same manner as that in Example 1, except that the time, during which each sample was treated with ozone, was kept at 10 seconds and the concentration of ozone in the treatment chamber was selected from 5,000, 28,000, and 98,000 ppm.

COMPARATIVE EXAMPLE 1

A thin ferromagnetic metal film was overlaid on the non-magnetic substrate 5 in the same manner as that in Example 1, except that no oxygen was introduced from the first oxygen inlet 9 of the vapor evaporation apparatus shown in FIG. 3 and oxygen was introduced at a rate of 250 cc/minute from the second oxygen inlet 10. Thereafter, treatment with ozone was carried out, and four kinds of samples of the magnetic recording medium web were prepared under different ozone treatment conditions.

COMPARATIVE EXAMPLE 2

Samples of the magnetic recording medium web were prepared in the same manner as that in Example 1, except that no treatment with ozone was carried out after the thin ferromagnetic metal film was formed.

COMPARATIVE EXAMPLE 3

Samples of the magnetic recording medium web were prepared in the same manner as that in Example 2, except that no treatment with ozone was carried out after the thin ferromagnetic metal film was formed.

COMPARATIVE EXAMPLE 4

Samples of the magnetic recording medium web were prepared in the same manner as that in Comparative Example 1, except that no treatment with ozone was carried out after the thin ferromagnetic metal film was formed.

For the samples of the magnetic recording medium web, which were prepared in the manner described above, the oxygen content in the thin ferromagnetic metal film was found, and resistance to corrosion was rated in the manner described below. Results shown in Tables 1 through 4 were thereby obtained.

The oxygen content in the thin ferromagnetic metal film was found with Auger electron spectroscopy.

As for resistance to corrosion, resistance to rust due to water and oxygen was rated (rating-1), and resistance to rust due to salts was rated (rating-2) in the manner described below.

Rating-1

A sample of the magnetic recording medium web was placed on a sample drum of a Model E dew condensation tester, which was supplied by Yamazaki Seiki Seisakusho. Vapor of distilled water having a temperature of 35° C. and high humidity was blown to the thin ferromagnetic metal film of the sample. The sample was then cooled to a temperature below 10° C., and dew was thereby formed on the surface of the sample. Thereafter, the surface of the sample was dried at a temperature of approximately 60° C. by using an infrared heater. The time of the cycle from dew condensation to drying was adjusted to be one hour, and the cycle was repeated for 24 hours. The condition of the surface of the thin ferromagnetic metal film of the sample was then investigated with the naked eye and with a light microscope (magnification: 50).

Rating-2

An aerosol of a saline solution having a concentration of 15 wt% was blown for three minutes to the thin ferromagnetic metal film of a sample of the magnetic recording medium web. The sample was then left to stand for two days at a temperature of 60° C. and relative humidity of 80%. Thereafter, the condition of the surface of the thin ferromagnetic metal film of the sample was then investigated with the naked eye and with a light microscope (magnification: 50).

Marks described below were given in accordance with the extent to which the thin ferromagnetic metal film of each sample rusted during the tests of rating-1 and rating-2.

Mark 1: Rust was found with the naked eye approximately over the whole surface.
Mark 2: Rust was found with the naked eye at several parts of the surface.
Mark 3: No rust was found with the naked eye, but a considerable amount of rust was found with the light microscope.
Mark 4: No rust was found with the naked eye, but a small amount of rust was found with the light microscope.
Mark 5: No rust was found with the naked eye, and little rust was found with the light microscope.

TABLE 1

(Effects of the time during which a sample was treated with ozone)

| Sample | Time during which a sample was treated with ozone | Corrosion resistance (marks of rating) | |
|---|---|---|---|
| | | Rating-1 | Rating-2 |
| Example 1 | 3 sec. | 4 | 3 |
| | 10 sec. | 5 | 4 |
| | 30 sec. | 5 | 5 |
| | 3 min. | 5 | 5 |
| Example 2 | 3 sec. | 3 | 2 |
| | 10 sec. | 4 | 3 |
| | 30 sec. | 5 | 3 |
| | 3 min. | 5 | 5 |
| Comparative Example 1 | 3 sec. | 2 | 1 |
| | 10 sec. | 4 | 1 |
| | 30 sec. | 4 | 2 |

TABLE 1-continued (Effects of the time during which a sample was treated with ozone)

| Sample | Time during which a sample was treated with ozone | Corrosion resistance (marks of rating) Rating-1 | Rating-2 |
| --- | --- | --- | --- |
| | 3 min. | 5 | 2 |

TABLE 2

(Effects of the temperature at which a sample was treated with ozone)

| Sample | Temperature at which a sample was treated with ozone (°C.) | Corrosion resistance (Marks of rating) Rating-1 | Rating-2 |
| --- | --- | --- | --- |
| Example 3 | 23 | 3 | 1 |
| | 50 | 4 | 2 |
| | 80 | 4 | 3 |
| | 120 | 5 | 5 |
| | 140 | 5 | 5 |

TABLE 3

(Effects of the ozone concentration at which a sample was treated)

| Sample | Ozone concentration at which a sample was treated (in ppm) | Corrosion resistance (marks of rating) Rating-1 | Rating-2 |
| --- | --- | --- | --- |
| Example 4 | 5,000 | 3 | 1 |
| | 28,000 | 5 | 4 |
| | 98,000 | 5 | 5 |

TABLE 4

(No Treatment with ozone)

| | Oxygen content in a thin ferromagnetic metal film (in at %) | | | Corrosion resistance (marks of rating) | |
| --- | --- | --- | --- | --- | --- |
| Sample | Whole | Vicinity of front surface | Vicinity of substrate | Rating-1 | Rating-2 |
| Comp. Ex. 2 | 24.0 | 5.8 | 7.0 | 2 | 1 |
| Comp. Ex. 3 | 21.8 | 5.6 | 4.1 | 2 | 1 |
| Comp. Ex. 4 | 14.0 | 2.5 | 2.5 | 1 | 1 |

We claim:

1. A method for making a magnetic recording medium, which comprises the steps of:
   i) forming a thin ferromagnetic metal film on a non-magnetic substrate, said thin ferromagnetic metal film containing Co as a main constituent and containing oxygen in a proportion of at least 15 at%, and
   ii) thereafter exposing said thin ferromagnetic metal film to an ozone-containing atmosphere.

2. A method as defined in claim 1 wherein oxygen is distributed in the thickness direction of said thin ferromagnetic metal film such that each of the oxygen content in the vicinity of the front surface of said thin ferromagnetic metal film, which surface is remoter from said non-magnetic substrate than the other surface is, and the oxygen content in the vicinity of said non-magnetic substrate is higher than the oxygen content in the vicinity of the middle of said thin ferromagnetic metal film.

3. A method as defined in claim 2 wherein the oxygen content in the vicinity of said non-magnetic magnetic substrate is at least 5 at%.

4. A method as defined in claim 1 wherein said thin ferromagnetic metal film is kept at a temperature of at least 80° C. during its exposure to said ozone-containing atmosphere.

5. A method as defined in claim 1 wherein the concentration of ozone in said ozone-containing atmosphere and the time, during which said thin ferromagnetic metal film is exposed to said ozonecontaining atmosphere, are adjusted such that the product of x and y may be at least 150,000, wherein x represents the concentration of ozone in ppm, and y represents the time in second.

* * * * *